April 2, 1957 R. S. DRUMMOND 2,787,747
METHOD OF AND MEANS FOR VARYING THE SPEED
OF ALTERNATING CURRENT MOTORS
Filed July 1, 1954 5 Sheets-Sheet 1

INVENTOR.
RALPH S. DRUMMOND
BY
J. Warren Kinney, Jr.
ATTORNEY

April 2, 1957  R. S. DRUMMOND  2,787,747
METHOD OF AND MEANS FOR VARYING THE SPEED
OF ALTERNATING CURRENT MOTORS
Filed July 1, 1954  5 Sheets-Sheet 3

INVENTOR.
RALPH S. DRUMMOND
BY
J. Warren Kinney Jr.
ATTORNEY

April 2, 1957    R. S. DRUMMOND    2,787,747
METHOD OF AND MEANS FOR VARYING THE SPEED
OF ALTERNATING CURRENT MOTORS
Filed July 1, 1954    5 Sheets-Sheet 4

INVENTOR.
RALPH S. DRUMMOND
BY
J. Warren Kinney, Jr.
ATTORNEY

April 2, 1957 R. S. DRUMMOND 2,787,747
METHOD OF AND MEANS FOR VARYING THE SPEED
OF ALTERNATING CURRENT MOTORS
Filed July 1, 1954 5 Sheets-Sheet 5
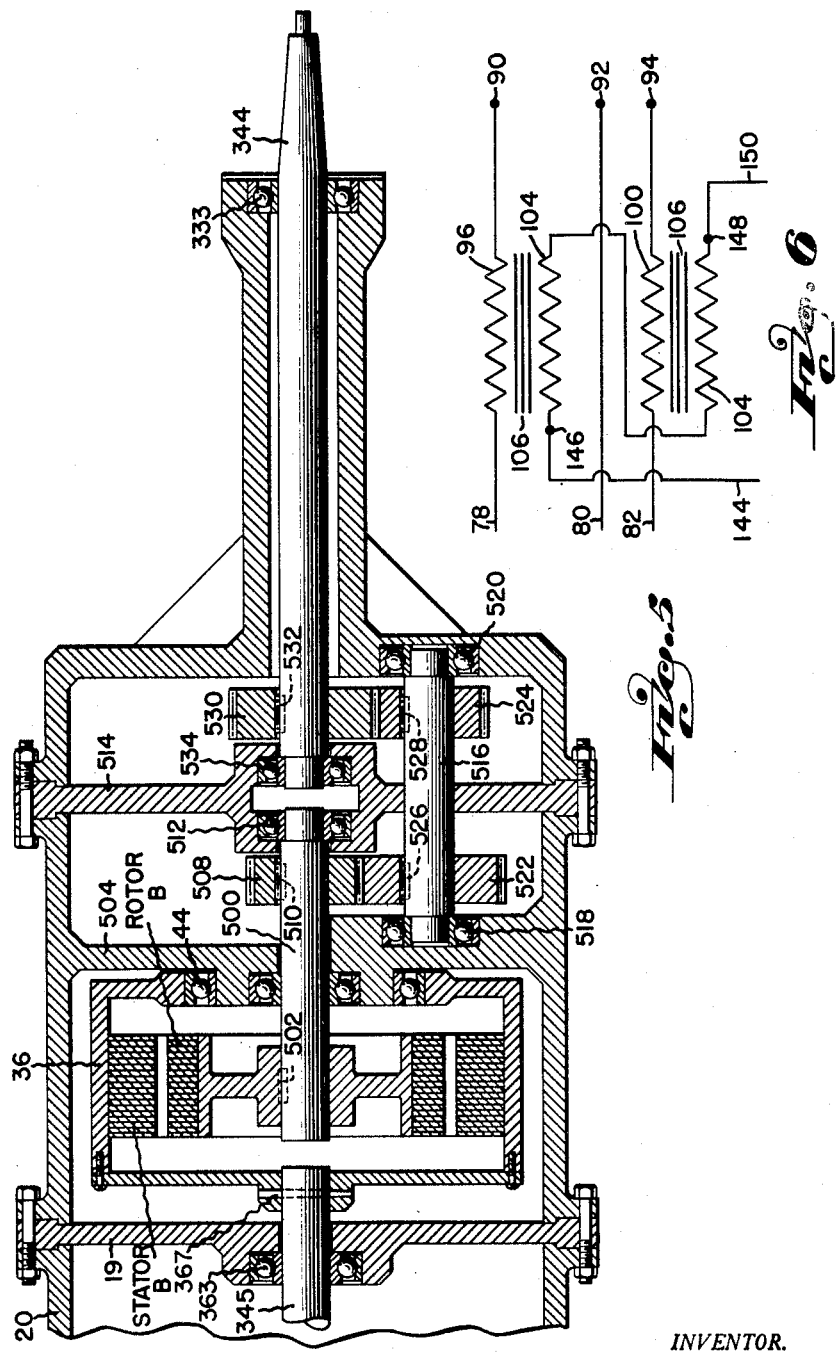
INVENTOR.
RALPH S. DRUMMOND
BY
J. Warren Kinney, Jr.
ATTORNEY 大专利号 2,787,747
Patented Apr. 2, 1957

2,787,747
METHOD OF AND MEANS FOR VARYING THE SPEED OF ALTERNATING CURRENT MOTORS

Ralph S. Drummond, Cincinnati, Ohio

Application July 1, 1954, Serial No. 440,631

13 Claims. (Cl. 318—45)

This invention relates to variable speed electrical apparatus, and more particularly to a method of and means for continuously or infinitely varying the speed of rotation of the drive shaft of an alternating current motor.

At the outset, and by way of review, it will be noted that heretofore the customary way of securing variable speed from an alternating current power source, has been to employ a wound rotor motor whose speed is varied by the introduction of resistance into the wound rotor circuit, however, such a system was extremely inefficient because the power dissipated in the form of heat in the secondary resistors is a complete loss, and the speed regulation characteristics are very poor, the speed variation being normally limited to about 50% of the maximum speed of the motor.

The present day multi-speed motors on the other hand provide for a selection of only two, three or four fixed speeds, dependent upon the motor windings. Several other methods of speed control are also presently available, but in each instance variable speed is secured by introducing losses either thru electrical or thru mechanical means with resultant inefficiencies.

One of the primary objects of my invention is to provide a method of and means for securing a variable speed drive operating from an alternating current source that is continuously variable from zero to maximum speed, has good speed regulation, high power factor, and efficiency comparable to that of a single speed induction motor loaded to the same degree, and which is designed to operate at low speeds for prolonged periods of times without excessive heating.

Another object of my invention is to provide a control circuit having the hereinabove described characteristics wherein the energy required to control the output speed of the motor is recovered and returned to the output shaft as useful power.

Still another object of the invention is to provide simple, yet highly effective means for controlling the output speed of a motor for providing infinite variance in speed from zero to maximum, while providing excellent speed regulation.

A further object of the invention is to provide a method of and apparatus for translating power from a prime mover, such as an engine or gas turbine, to the driving wheels of a vehicle so as to effectively adapt the limited speed-torque range of the prime mover to the unlimited speed-torque range required by the driving wheels of the vehicle. My invention eliminates the use of the conventional clutch, torque convertor, mechanical transmission, propeller tube and differential gear box. Elimination of the clutch housing and propeller tube permits lower center of gravity construction resulting in greater safety and the elimination of the objectionable "transmission tunnels" from the floor of a vehicle.

Another object of the invention is to provide a method of and means for controlling the speed of rotation of a drive shaft which is common to the rotors of a pair of similar motors having rotatable stators which are mechanically interconnected for opposed synchronous rotation, and wherein the action of the stators of the two motors is subtractive, but wherein the action of the rotors of the two motors is additive.

Still another object of the invention is to provide a pair of similar motors, the rotors of which are interconnected by a common shaft and whose stators are mechanically interconnected for opposed synchronous rotation, wherein the torque in one motor will always equal the torque of the other motor at any speed of the drive shaft. Such equalization in torque may be accomplished by rapidly switching a control current on and off to the stator of one of the motors at such frequency that the rotational speed of the other motor will be maintained at a predetermined speed by the alternate energization and deenergization of the first unit.

A further object of the invention is to provide a pair of similar motors each including a rotatable stator and rotatable rotor wherein the rotors are interconnected to a common drive shaft and wherein the stators are mechanically interconnected for opposed synchronous rotation, wherein one of the rotatable stators is utilized to control the operating characteristics of the other rotatable stator. At this point it should be clearly understood that I am familiar with those control devices wherein a rotatable stator is utilized to control the speed of a rotatable rotor by means of mechanical loading of the rotatable stator, however, my method and apparatus are to be distinguished therefrom.

Another object of the invention is the utilization of a saturable reactor for controlling the operating characteristics of the control stator of one of the two similar motors interconnected as set forth in the preceding paragraphs.

These and other objects may be attained by the means described herein and as disclosed in the accompanying drawings, in which:

Fig. 5 is a sectional view of one end of the apparatus of Fig. 3 modified to include a gear train in the drive.

Fig. 6 is a wiring diagram of a modification of the saturable reactor illustrated in Figs. 2 and 4.

Figure 1:
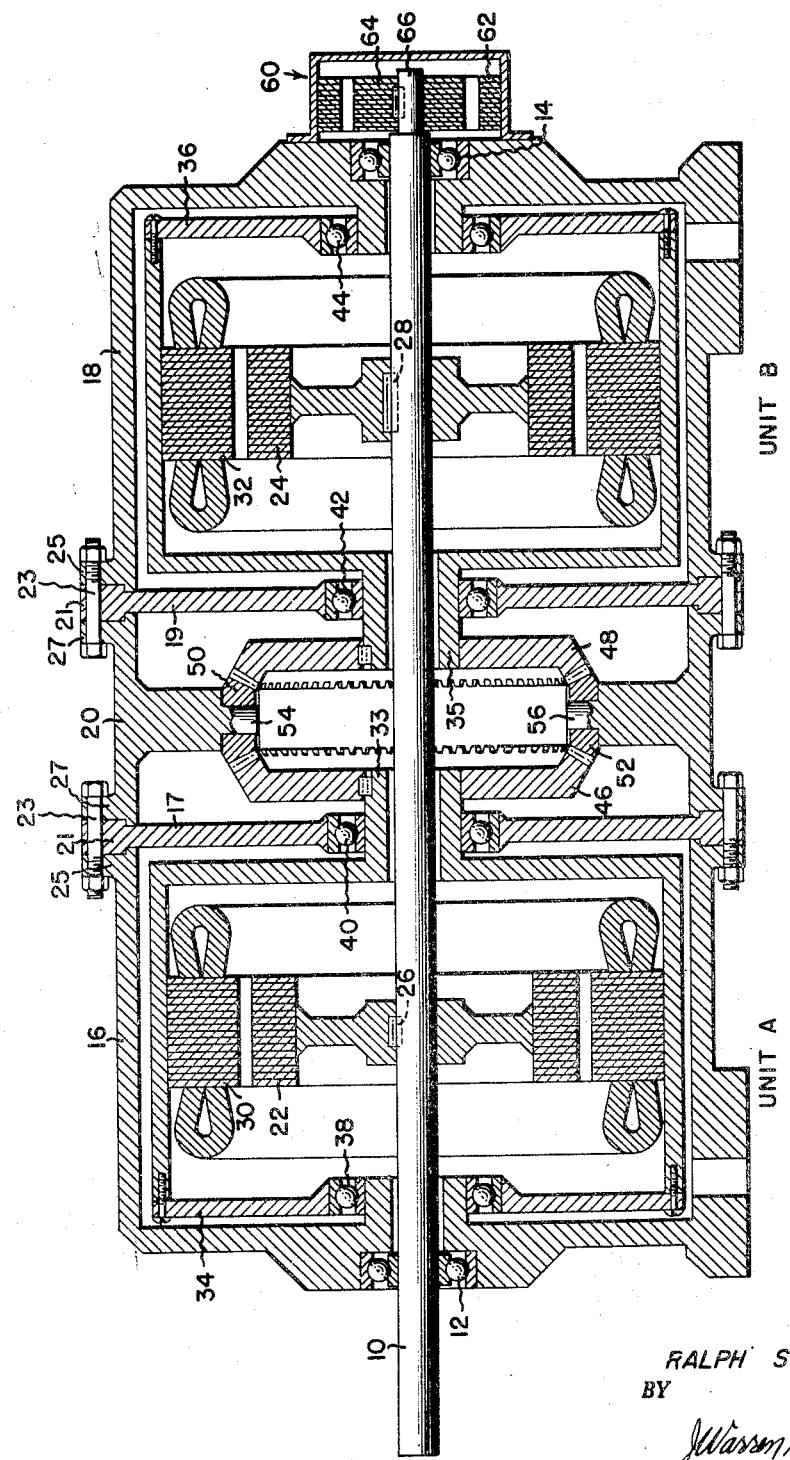
Fig. 1 is a sectional view of a variable speed electrical apparatus embodying the teachings of the present invention.

With reference now to Fig. 1 the numeral 10 denotes a rotatable shaft suitably journaled as at 12 and 14 to end sections 16 and 18 of a three section housing, the third or intermediate section being denoted by the numeral 20. The adjacent or inner ends of sections 16 and 18 are separated from the intermediate section by walls 17 and 19 which include a terminal flange 21 engageable by bolts 23 which pass through terminal flanges 25 and 27 respectively of the end and intermediate sections for providing a unitary, but separable main housing.

Shaft 10 is common to rotors 22 and 24, being keyed thereto as at 26 and 28.

Stators 30 and 32 are interconnected for opposed synchronous rotation as follows: Stators 30 and 32 are fixedly secured to and carried by their respective rotatably mounted cages 34 and 36 which are journaled at 38, 40, 42 and 44 to the main housing. Bevel gears 46 and 48 are keyed to sleeve portions 33 and 35 of cages 34 and 36 respectively, said gears meshing with idler gears 50 and 52 rotatably journaled as at 54 and 56 relative to the intermediate section 20 of the main housing whereby rotation of stator 30 and its cage 34 will be in a direction opposite to the direction of rotation of stator 32 and its cage 36.

The numeral 60 denotes generally a governor generator having a stationary armature 62 and a rotating field 64 secured in driven relationship to end 66 of shaft 10. A gear, coupling, or the like, not illustrated, will be secured to and carried by the other end of the shaft.

For ease of understanding those elements housed within end section 16 will be generally referred to as unit A, and the elements in section 18 as unit B, viz. stator A, rotor A, etc.

Figure 2:
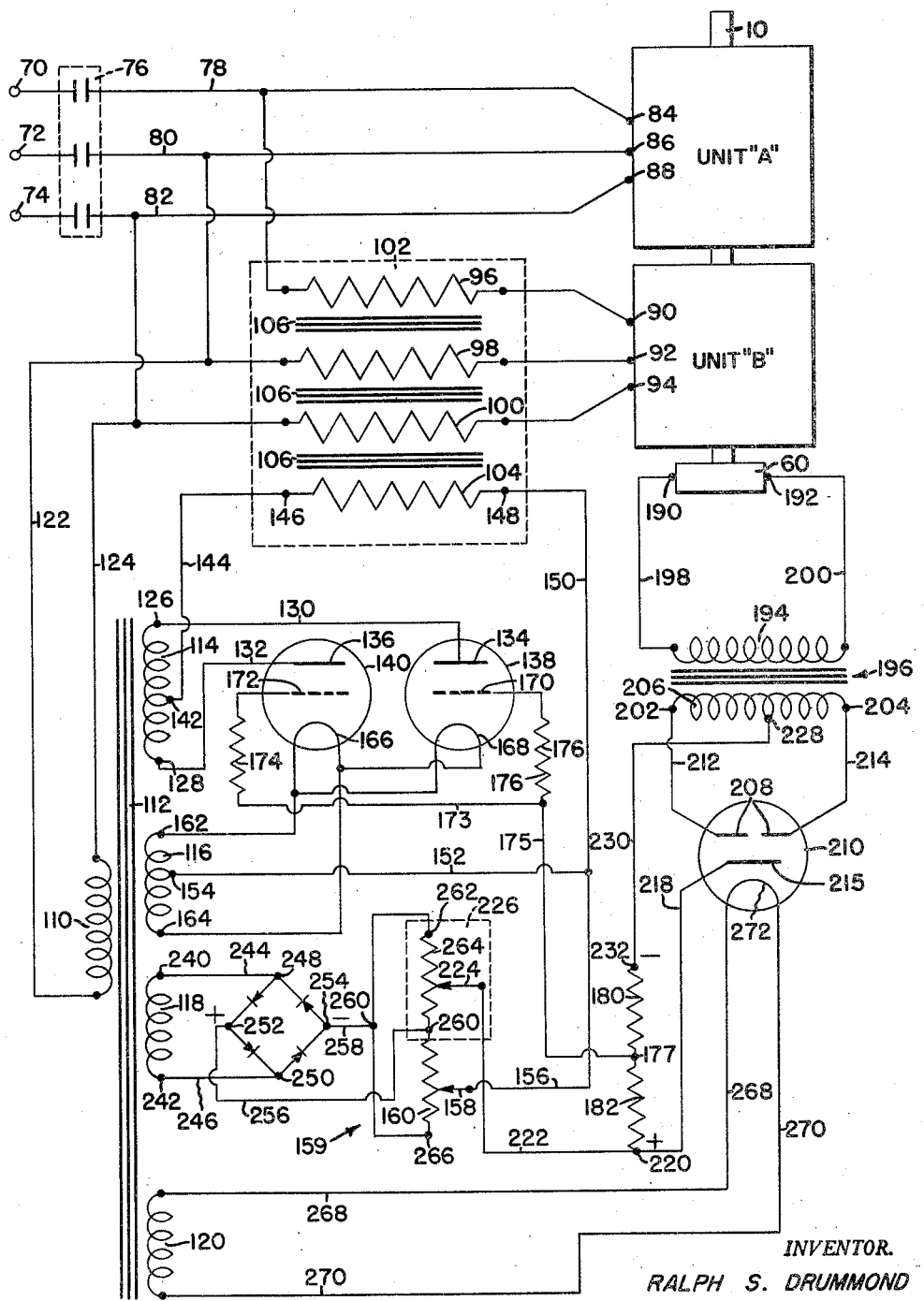
Fig. 2 is a wiring diagram of a control circuit for the apparatus of Fig. 1.

Reference is now made to Fig. 2 wherein the control circuit for generator 60 and units A and B is illustrated. The numerals 70, 72 and 74 denote a source of alternating current and the numeral 76 a conventional switch through which conductors 78, 80 and 82 are connected to said source.

Conductors 78, 80 and 82 are connected directly to terminals 84, 86 and 88 of stator A, and to terminals 90, 92 and 94 of stator B through windings 96, 98 and 100 of a saturable reactor denoted generally by the numeral 102 which includes a control winding 104 which controls the flux density in core 106 which is common to each of windings 96, 98, 100 and 104. The flux density of core 106 controls the impedance of windings 96, 98 and 100 which in turn regulates the amount of current delivered to stator B.

At this point it should be noted that the application of current to stator A will cause it to rotate in one direction and stator B will be driven at the same speed but in the opposite direction by reason of the gearing illustrated in Fig. 1. Shaft 10 will remain stationary and no voltage will be developed in generator 60.

The direct current required to control the saturable reactor via control winding 104 may comprise a gaseous grid control rectifier whose firing characteristics are controlled by a combination of voltages from generator 60 and a source of adjustable basic voltage provided as follows:

The numeral 110 denotes the primary coil of a transformer which includes a core 112 and four secondary coils 114, 116, 118 and 120; said primary coil being connected across conductors 80 and 82 via conductors 122 and 124.

The end taps 126 and 128 of secondary coil 114 are connected by conductors 130 and 132 to anodes 134 and 136, respectively, of commercially available gaseous grid control rectifier tubes denoted generally by the numerals 138 and 140. Center tap 142 is connected by conductor 144 to in-put terminal 146 of control winding 104 of the saturable reactor 102, the out-put terminal 148 of which is connected by conductors 150 and 152 to center tap 154 of secondary coil 116, and by conductor 156 to sliding contact element 158 of a potentiometer 159 which includes a resistor 160.

End taps 162 and 164 of secondary coil 116 are connected in series circuit with filament 166 and 168 of tubes 140 and 138, respectively, it being noted that the said filaments are mutually connected in parallel circuit.

Grids 170 and 172 of tubes 138 and 140 are in a parallel circuit which includes ballast resistors 174 and 176 interconnected by conductor 173 to conductor 175 to center tap 177 of a voltage divider which includes resistors 180 and 182.

Out-put terminals 190 and 192 of governor generator 60 are connected across primary coil 194 of the governor generator transformer denoted generally by the numeral 196 by means of conductors 198 and 200. The end taps 202 and 204 of the secondary coil 206 of the transformer are connected to anodes 208 of a rectifier tube 210 by means of conductors 212 and 214, respectively.

Cathode 215 is connected by conductor 218 to end terminal 220 of resistor 182 of the voltage divider and by conductor 222 to slider arm 224 of a speed setting potentiometer denoted generally by the numeral 226.

The middle tap 228 of secondary coil 206 is connected by conductor 230 to the other end 232 of the voltage divider and in series circuit with resistor 180 thereof.

Terminals 240 and 242 of secondary coil 118 are connected by conductors 244 and 246 to in-put terminals 248 and 250 of a full wave rectifier, the output terminal 252 of which is connected by conductors 256 to center tap 260 between the speed setting potentiometer 226 and the adjusting potentiometer 159. The other out-put terminal 254 is connected by conductor 258 to end tap 262 of resistor 264 of the speed setting potentiometer 226. Conductor 258 is likewise connected to end tap 266 of resistor 160 of the adjusting potentiometer 159.

Secondary winding 120 is connected by conductors 268 and 270 across filament 272 of rectifier tube 210, as illustrated.

*Mode of speed control*

With particular reference now to Figs. 1 and 2, it will be noted that when switch 76 has been actuated for completing an electrical circuit to conductors 78, 80 and 82, current will be supplied to terminals 84, 86 and 88 of stator A for thereby imparting a driving torque thereto.

Stator B has the same electrical and mechanical characteristics as stator A and by reason of the mechanical connection between cages 34 and 36 via gears 46, 48, 52 and 54 rotation of stator A and its cage 34 in a clockwise direction will result in rotation of stator B and its cage 36 in counterclockwise direction.

Power also is supplied to stator B through the saturable reactor 102 in a degree determined by the control winding 104. It should be clearly understood that shaft 10 will not rotate until stator B has been excited. Excitation of stator B will be effected incident to manual adjustment of arm 224 of the speed control potentiometer 226 for obtaining a predetermined speed of rotation of out-put shaft 10. This may be accomplished, in Fig. 2, by moving arm 224 toward central tap 260 at the positive end of resistor 264, thereby unbalancing the speed control potentiometer and the adjusting potentiometer 159 for thereby applying a voltage to control grids 170 and 172 of tubes 138 and 140, respectively, thereby rendering these tubes conductive. When tubes 138 and 140 become conductive, direct current will flow from anodes 134 and 136 to filaments 168 and 166, respectively, to end taps 162 and 164, to central tap 154, thence through conductors 152 and 150 to tap 148 of the control winding 104, the circuit being completed through conductor 144 to central tap 142 of secondary coil 114 thence back to anodes 134 and 136 through conductors 130 and 132, respectively.

With the control winding 104 thus energized with direct current, the core 106 will then become saturated and the impedance of windings 96, 98 and 100 will be decreased to a minimum value, thereby permitting current to flow to terminals 90, 92 and 94 of stator B for thereby imparting a positive driving force to stator B in opposition to the rotary motion imparted to it by reason of its driven connection with stator A.

The braking force thus applied to stator A incident to energization of stator B will result in a slow-down of the rotational speed of stator A and rotor A will start to rotate in a counter-clockwise direction, since I have assumed that stator A is rotating in a clockwise direction.

Rotation of shaft 10 produces an output voltage across terminals 190 and 192 of governor generator 60. It should be understood that the characteristics of the governor generator are such that its out-put is directly proportionate to the speed of rotation of shaft 10, that is, the higher the speed of rotation, the greater the generated voltage.

The voltage thus induced across terminals 190 and 192 of the control generator is utilized to control the operating characteristics of tubes 138 and 140 in the following manner:

As the shaft 10 accelerates, generator 60 accelerates with an increasing voltage and will continue to accelerate until the voltage generated by the generator is equal to and opposes the voltage selected by the speedsetting potentiometer 226. When the voltage thus produced by the generator opposes the voltage selected by the speed-setting potentiometer 226, the firing of tubes 138 and 140 is stopped and control winding 104 is de-energized, causing the core 106 to become unsaturated and the impedance in windings 96, 98 and 100 to rise for thereby preventing power from flowing into terminals 90, 92 and 94 of stator B.

With the braking effect of stator B on stator A reduced, stator A will increase its speed of rotation, causing a corresponding decrease in the speed of rotor A which, being mounted upon shaft 10, produces a corresponding decrease in the speed of governor generator 60. As the speed of generator 60 decreases, with the resultant decrease in voltage below the voltage selected by speed-setting potentiometer 226, the tubes 138 and 140 will again fire, passing direct current through control winding 104, thereby producing saturation in the core of saturable reactor 102, with a resultant decrease in the impedance of windings 96, 98 and 100, thus permitting power to flow once more to terminals 90, 92 and 94 of stator B. With power again applied to stator B, the braking effect on stator A is restored. Stator A will then slow down, resulting in an increase in speed of rotor A, thereby completing a control cycle.

Figure 3:
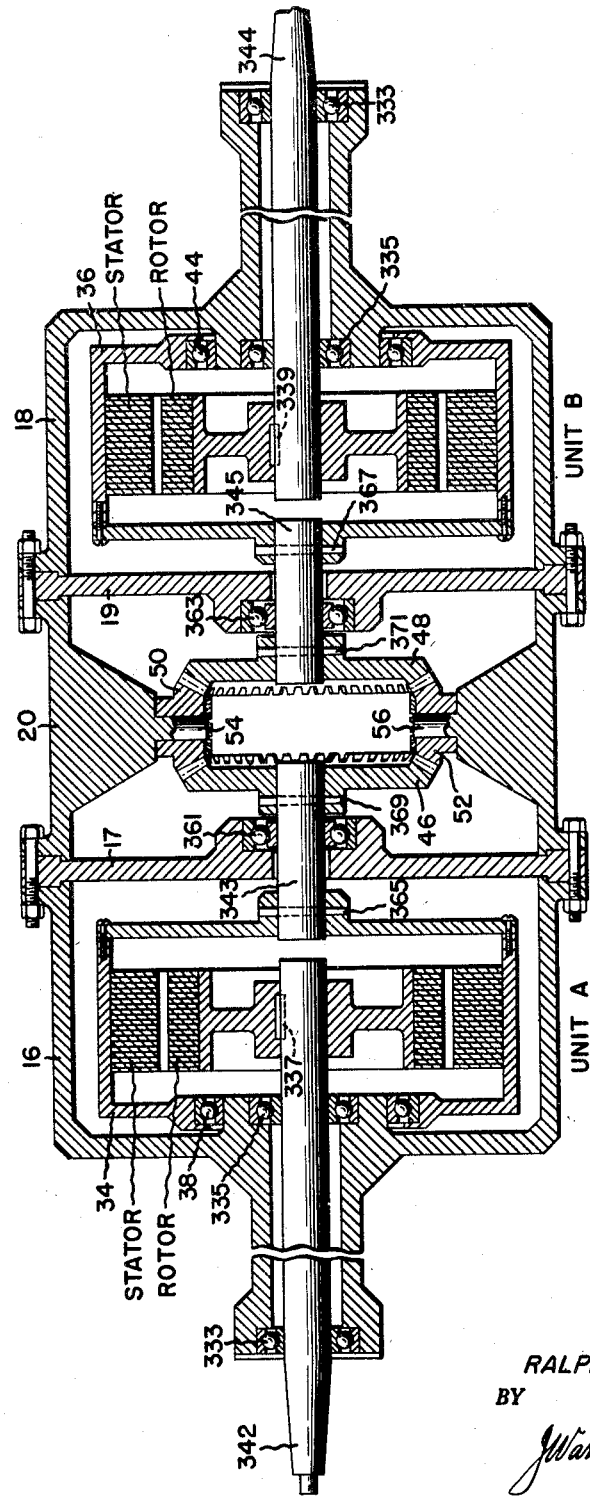
Fig. 3 is a sectional view of the variable speed electrical apparatus of Fig. 1 utilized as a vehicle drive.
Figure 4:
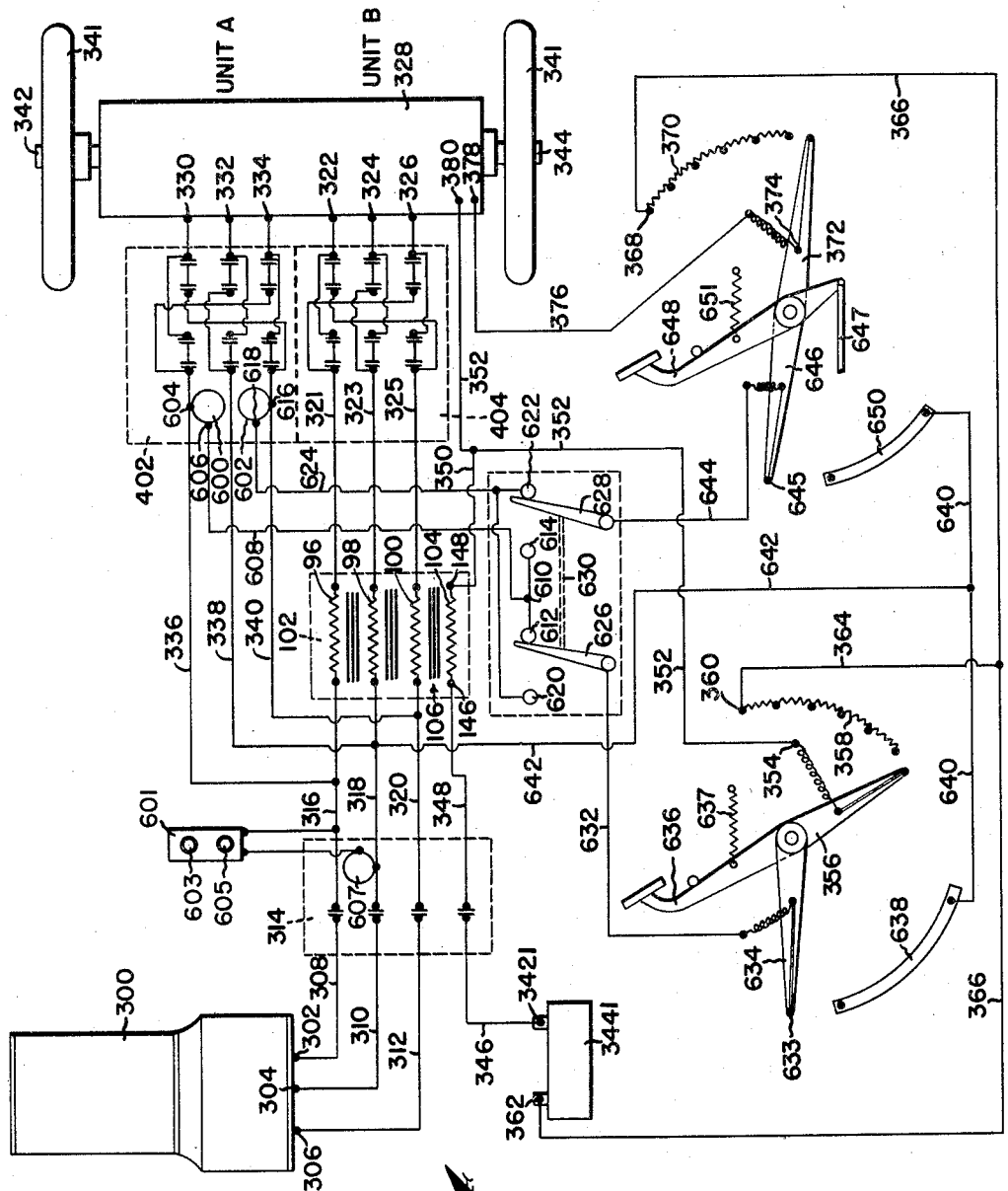
Fig. 4 is a wiring diagram of the control circuit for the apparatus of Fig. 3.

In Figs. 3, 4 and 5 I have indicated the manner in which my invention may be applied to a self-propelled vehicle, such as, by way of example, an automobile.

With reference now to Fig. 3 it will be noted that shaft 10 of Fig. 1 has been replaced by four stub shafts, 342, 343, 344 and 345, wherein shafts 342 and 344 are each provided with ground engaging wheels 341 (Fig. 4).

It should be understood that shafts 342 and 344, and therefore rotors A and B, are interconnected via wheels 341 and the ground for uniform and synchronous rotation.

Shafts 342 and 344 may be suitably journaled as at 333 and 335 to the end housings 16 and 18, said shafts being keyed to rotors A and B as at 337 and 339 respectively.

Shafts 343 and 345 are journaled as at 361 and 363 to intermediate section walls 17 and 19 and are pinned as at 365 and 367 to cages 34 and 36 respectively of stators A and B. The other ends of these shafts are pinned as at 369 and 371 to bevel gears 46 and 48 respectively whereby the cages and stators A and B are mounted for opposed synchronous rotation.

In Fig. 4 the composite housing of Fig. 3 has been indicated generally by the rectangular housing denoted by the numeral 328.

With particular reference now to Fig. 4, the numeral 300 denotes generally a motor-generator unit having terminals 302, 304 and 306 connected by conductors 308, 310 and 312 to the input side of a magnetic switch denoted generally by the numeral 314. Conductors 316, 318 and 320 are in series circuit with the output side of the switch and are respectively connected to one end of windings 96, 98 and 100 of a saturable reactor 102, it being noted that the same reference numerals have been applied to those elements which are common to Figs. 2 and 4. The other end of windings 96, 98 and 100 are connected by conductors 321, 323 and 325, respectively, to terminals 322, 324 and 326 of stator A (see Fig. 3) which, like stator A of Fig. 1, is enclosed within composite housing 328.

Terminals 330, 332 and 334 of stator A are connected to conductors 316, 318 and 320 by conductors 336, 338 and 340.

In the preferred embodiment of the invention a magnetic reversing switch denoted generally by the numerals 402 and 404 is interposed in conductors 321, 323, 325, 336, 338 and 340 for changing the polarity of the current passing to the stators A and B for reversing the direction of rotation of the stators, their respective rotors and drive shafts 342 and 344, as hereinafter more fully explained.

Terminal 146 of control winding 104 is connected to terminal 3421 of battery 3441 through magnetic switch 402-404 and conductors 346 and 348. The other terminal 148 of the control winding is connected by conductors 350 and 352 to terminal 354 of the movable contactor 356 of a foot operated rheostat which includes a resistance coil 358, terminal 360 of which is connected to battery terminal 362 by conductors 364 and 366.

Battery terminal 362 is also connected via conductor 366 to terminal 368 of resistance coil 370 of a second foot actuated rheostat which includes a movable contactor arm 372, terminal 374 of which is connected through conductor 376 to terminal 378 of a commercially available zero-speed switch, terminal 380 of which is connected to conductor 352. In passing it should be noted that the inherent characteristics of the zero-speed switch are such that terminals 378 and 380 are in closed series circuit during those periods of time when shaft 344 is rotating, said closed circuit being automatically opened when shaft 344 has zero speed.

From the foregoing it will be noted that the speed of rotation of shafts 342 and 344 are determined by and are a function of the setting of contactor arm 356, since movement thereof in a counterclockwise direction will increase the flux density in cores 106 for decreasing the impedance of windings 96, 98 and 100 thereby permitting more current to flow to terminals 322, 324 and 326 of stator of unit B.

A spring 637 normally and yieldably urges the contactor arm to the "off" position illustrated in Fig. 4 for electrically disconnecting the control winding 104 from the throttle circuit and thereby increasing the impedance to windings 96, 98 and 100 for cutting off flow of electrical power to the stator of unit B which is then free to free-wheel.

In Fig. 4 the numerals 600 and 602 denote a pair of solenoids which are adapted to be selectively energized to actuate the reversing switches 402 and 404 whereby to provide forward and reverse rotation of wheels 341.

Terminal 604 is in series circuit with conductor 336 whereas terminal 606 is connected by conductor 608 to terminal 610 which is common to "forward" contacts 612 and 614.

Terminal 616 of solenoid 602 is in series circuit with conductor 340 whereas terminal 618 is connected to "reverse" contacts 620 and 622 via conductor 624.

The numerals 626 and 628 denote a pair of pivotally mounted manually shiftable contactor arms interconnected as at 630 by a nonconducting member whereby when one arm engages a "reverse" contact the other arm will contact a "forward" contact.

Arm 626 is in series circuit via conductor 632 with contact 633 of contactor arm 634 of the accelerator pedal 636. Contact 633 will engage conductor strip 638 for completing an electric circuit to conductor 338 via conductors 640 and 642. Likewise arm 628 is in series circuit via conductor 644 with contact 645 of contactor arm 646 of the brake pedal 648. Contact 645 will engage conductor strip 650 which is in series circuit with conductor 338 via conductors 640 and 642.

*Operation*

Operation of the device of Figs. 3 and 4 may be summarized as follows: First generating unit 300 will be started whereby to energize terminals 302, 304 and 306. A suitable switch 601 including a start button 603 and stop button 605 may be provided for energizing actuating-solenoid 607 of switch 314. When the start button 603 is pushed the switch will be closed and electric power will be supplied to terminals 330, 332 and 334 of the stator of unit A which will be driven whereby to revolve at full rated speed with its rotor remaining stationary.

The operator will then set contactor arm 626 to engage forward contact 612, assuming that the vehicle is to be propelled in a forward direction, and then as the accelerator pedal 636 is depressed against the counterforce of spring 637 contactor arm 356 will engage resistance winding 358 for placing control winding 104 of the saturable reactor 102 in series circuit with battery 3441, for supplying direct current to said control winding. The further the accelerator pedal is depressed the less of resistance winding 338 will be in the battery circuit whereby more direct current will flow to control winding 104 which will produce an increase in the magnetic flux of the core thus reducing the impedance of the series windings 96, 98 and 100, and allowing more current to be applied to terminals 322, 324 and 326 of the stator of unit B. This will result in the development of a counter-torque of the stator of unit B which will slow down, retard or brake the rotational speed of the stator A with the result that the reaction forces between stator of unit B and the rotor of unit A will cause the rotor of unit A to accelerate thereby imparting a driving force to wheels 341. The operator may conveniently regulate the speed of rotation of the wheels by movement of the accelerator pedal.

When it becomes necessary or desirable to arrest the forward speed of the vehicle the operator need only depress braking pedal 648 for thereby actuating brake rod 647 of a conventional braking means, not illustrated. Concurrently with the application of the mechanical braking force contactor arm 372 will engage resistance winding 370 for thereby energizing control winding 104 of the saturable unit 102, however, it will be noted that contactor 645 will engage segment 650 for completing an electric circuit to the "reverse" solenoid 602, via conductor 624, contactor 622, contactor arm 628, conductor 644, contact 645, segment 650, conductors 640 and 338, thereby placing the solenoid in series circuit across lines 338 and 340 for reversing magnetic switches 402 and 404 to change the direction of rotation of the stators of units A and B and as well as the direction of their corresponding rotors and thereby apply a positive braking action to wheels 341. In other words, I thus obtain an electric braking effect to augment the mechanical braking induced by operation of brake rod 647.

When the vehicle has been stopped the zero-speed switch will be actuated for thereby automatically opening the circuit between terminals 370 and 378, thereby precluding accidental or unintentional further rearward movement of the vehicle. When the foot brake 648 is released, spring 651 will return it to the position illustrated in Fig. 4 for thereby automatically effecting de-energization of reverse solenoid 602 whereby depressing of accelerator pedal 636 will result in forward movement of the vehicle.

Should it be desired to operate the vehicle in a rearward direction then contactor arm 626 would be shifted to engage contact 620 and at the same time contactor arm 628 would automatically engage contact 624. Braking action would be obtained by applying a forward torque to wheels 341 incident to actuation of brake pedal 648 which now would result in actuation of "forward" solenoid 600 until the vehicle had been brought to a stop.

In Fig. 5, I have indicated how the device of Fig. 3 may be conveniently modified for reducing the rotational speeds of shafts 342 and 344. The numeral 500 denotes a stub shaft keyed to rotor B as at 502, journaled to a second intermediate wall 504 as at 506 and keyed to gear 508 at 510. That end remote from the rotor may be journaled as at 512 to a third intermediate wall 514.

A jack shaft 516 journaled at 518 and 520 carries gears 522 and 524 which are keyed thereto as at 526 and 528 respectively, gear 522 meshing with and being of a diameter larger than gear 508.

Gear 524 meshes with a larger gear 530 keyed to shaft 344 as at 532, the inner end of said shaft being suitably journaled as at 534 to wall 514.

From the foregoing it will be noted that gear train 508, 522, 524 and 530 will considerably reduce the rotational speed of shaft 344 below that of shaft 500. It should, of course, be understood that a duplicate gear train will be interposed between rotor A and shaft 342.

In conclusion it will be noted that I have provided a simple, yet highly effective method and means for efficiently controlling the rotational speed of the output shaft of an alternating current motor.

In Fig. 6 I have illustrated a modified type of saturable reactor which may be substituted for the saturable reactors illustrated in the circuits of Figs. 2 and 4. The circuit of Fig. 6 differs from those of Figs. 2 and 4 in that no load winding is in line 80, and two control windings 104 are illustrated in series circuit, one for each of load windings 96 and 100.

It should be understood that various changes and modifications may be made, within the scope of the appended claims, without departing from the spirit of the invention.

What is claimed is:

1. The method of controlling the speed of rotation of the drive shaft of an electric motor of the type which includes a rotatable rotor inductively coupled to a rotatable stator, wherein the direction of rotation of the rotor is opposite the direction of rotation of the stator at speeds equal to the rated motor speed less the stator speed, which method comprises the step of providing a second electric motor having similar mechanical and operating characteristics, of securing a common drive shaft to the rotors of both motors, of interconnecting the stators for opposed synchronous rotation, of then applying line voltage directly to the first stator, and of then applying a variable line voltage to the other stator for developing a torque in opposition to the torque developed by the first stator.

2. The method of controlling the speed of rotation of the drive shaft of an electric motor of the type which includes a rotatable, shaft-carrying rotor inductively coupled to a rotatable stator, wherein the direction of rotation of the rotor is opposite the direction of rotation of the stator at speeds equal to the rated motor speed less the stator speed, which method comprises the step of providing a second electric motor having similar mechanical and operating characteristics, of securing a common drive shaft to the rotors of both motors, of interconnecting the stators for opposed synchronous rotation, of then applying line voltage directly to the first stator for causing it to rotate in one direction at rated motor speed while driving the other stator in the opposite direction and with the rotors stationary, and of then applying a modified line voltage to the other stator for developing a torque in opposition to the torque developed by the first stator for simultaneously decreasing the speed of the stators while proportionally increasing the speed of rotation of the rotors and drive shaft.

3. The method of controlling the speed of rotation of a rotatable drive shaft which is common to the inductively coupled rotors of a pair of rotatable stators interconnected for opposed synchronous rotation, which method comprises the steps of applying line voltage directly to the first stator for imparting a maximum torque thereto, and of then applying a variable line voltage to the other stator for developing a countertorque in the second stator opposing the torque developed by the first stator and for imparting a driving torque to said rotors and shaft.

4. A circuit for controlling the speed of rotation of a drive shaft common to a pair of similar electric motors of the type which include a rotatable rotor inductively coupled to a rotatable stator, wherein the speed of rotation of the rotors is equal to the rated motor speed less the stator speeds, means securing the drive shaft to the rotors of both motors, and means interconnecting the stators for opposed synchronous rotation, said circuit comprising means for applying line voltage directly to the first stator for causing it to rotate in one direction at rated motor speed while driving the second stator in the opposite direction and with the rotors stationary, and means for applying a variable line voltage to the second stator for developing a torque in opposition to the torque developed by the first stator for simultaneously decreasing the speed of the stators while proportionally increasing the speed of rotation of the rotors and drive shaft.

5. The circuit of claim 4 wherein the means for applying a control voltage to the second stator includes a saturable reactor having load windings in parallel circuit with the electrical supply to the first stator, a control winding, and means providing direct current to the control winding for altering the impedance of the said load windings.

6. A variable speed vehicle drive comprising, in combination, a pair of similar electric motors of the type which include a rotatable rotor inductively coupled to a rotatable stator and wherein the speed of rotation of the rotors is equal to the rated motor speed less the stator speeds, a drive shaft for each of the rotors of the motors, driving wheels secured to and carried by each drive shaft, said wheels engaging a common supporting surface, means interconnecting the stators for opposed synchronous rotation, a source of electrical energy, means for applying full voltage directly to the stator of the first motor for causing said stator to rotate in one direction at rated motor speed while driving the stator of the second motor in the opposite direction, means for applying a variable control voltage to the stator of the second motor for developing a torque in said stator in opposition to the torque developed by the stator of the first motor for simultaneously decreasing the overall speed of both of said stators while proportionally increasing the speed of rotation of their respective rotors and the drive shafts and driving wheels in driven relationship therewith.

7. A variable speed vehicle drive comprising, in combination, a portable source of alternating electrical energy, a pair of similar electric motors of the type which include a rotatable rotor inductively coupled to a rotatable stator and wherein the speed of rotation of the rotors is equal to the rated motor speed less the stator speeds, a drive shaft for each of the rotors of the motors, a vehicle driving wheel in driven relationship with each of said drive shafts, means mechanically interconnecting the stators of the motors for opposed synchronous rotation, means for applying full alternating electrical energy directly to the stator of the first motor for causing said stator to rotate in one direction at rated motor speed while driving the stator of the second motor in the opposite direction, and means for applying variable amounts of alternating electrical energy to the stator of the second motor for developing a torque in said stator in opposition to the torque developed by the stator of the first motor for simultaneously decreasing the overall speed of both of said stators while proportionally increasing the speed of rotation of their respective rotors and the drive shafts and driving wheels in driven relationship therewith.

8. The combination of claim 7 wherein the means for applying variable amounts of alternating electrical energy to the stator of the second motor includes a saturable reactor having load windings in parallel circuit with the alternating electrical energy supplied to the stator of the first motor, a control winding for said load windings, and means providing direct current to the control winding for altering the impedance of the said load windings.

9. A variable speed vehicle drive comprising, in combination, a portable source of alternating electrical energy, a pair of similar electric motors of the type which include a rotatable rotor inductively coupled to a rotatable stator and wherein the speed of rotation of the rotors is equal to the rated motor speed less the stator speeds, a drive shaft for each of the rotors of the motors, a vehicle driving wheel in driven relationship with each of said drive shafts, means mechanically interconnecting the stators of the motors for opposed synchronous rotation, means for applying full alternating electrical energy directly to the stator of the first motor for causing said stator to rotate in one direction at rated motor speed while driving the stator of the second motor in the opposite direction, a first manually operable control member for applying amounts of alternating electrical energy to the stator of the second motor for developing a torque in said stator in opposition to the torque developed by the stator of the first motor for simultaneously decreasing the overall speed of both of said stators while proportionally increasing the speed of rotation of their respective rotors and the drive shafts and driving wheels in driven relationship therewith, a magnetic reversing switch in series circuit with the stator circuits of both motors, a second manually operable control member in series circuit with said reversing switch and operable like the first manually operable control member for applying variable amounts of alternating electrical energy to the stator of the second motor, wherein actuation of said second control member applies a braking torque to the motors for stopping the vehicle.

10. In the combination of claim 9, the addition of means in the control circuit of the second manually operable control member for automatically breaking said circuit when movement of the vehicle has been stopped as the result of the application of the braking torque applied by reason of actuation of said second control member.

11. A circuit for controlling the speed of rotation of the rotors of a pair of similar electric motors of the type which include a rotatable rotor inductively coupled to a rotatable stator, means interconnecting the rotors of both motors for synchronous rotation in the same direction, and means interconnecting the stators for opposed synchronous rotation, a source of electrical energy, said circuit comprising means for applying full voltage directly to the stator of the first motor for causing it to rotate in one direction at rated motor speed while driving the second stator at the same speed in the opposite direction, and means for applying a variable voltage to the stator of the second motor for developing a torque in opposition to the torque developed by the first stator for simultaneously decreasing the overall speed of both stators while proportionately increasing the speed of rotation of the rotors.

12. The method of controlling the speed of rotation of a rotatable drive shaft which is common to the inductively coupled rotors of a pair of rotatable stators interconnected for opposed synchronous rotation, which method comprising the steps of applying line voltage directly to the first stator for imparting a maximum torque thereto, and of then applying a line voltage modified by a variable impedance to the other stator for developing a countertorque in the second stator opposing the torque developed by the first stator and for imparting a driving torque to said rotors and shaft.

13. The method of controlling the speed of rotation of a rotatable drive shaft which is common to the inductively coupled rotors of a pair of rotatable stators interconnected for opposed synchronous rotation, which method comprises the steps of applying line voltage directly to the first stator for imparting a maximum torque thereto, and of then applying a line control voltage which is a function of the rotor speed to the other stator for developing a countertorque in the second stator opposing the torque developed by the first stator and for imparting a driving torque to said rotors and shaft.

References Cited in the file of this patent
FOREIGN PATENTS
347,388    Germany _____ Jan. 18, 1922